US007870041B2

(12) United States Patent
Henderson et al.

(10) Patent No.: US 7,870,041 B2
(45) Date of Patent: Jan. 11, 2011

(54) METHOD AND STORAGE MEDIUM FOR MANAGING COLLABORATIVE FORECASTING AND REPLENISHMENT

(75) Inventors: Mark A. Henderson, Cornwall, NY (US); Thomas A. Jobson, Jr., New Paltz, NY (US); Michael P. Murray, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 2824 days.

(21) Appl. No.: 10/320,071

(22) Filed: Dec. 16, 2002

(65) Prior Publication Data

US 2004/0117273 A1   Jun. 17, 2004

(51) Int. Cl.
*G06Q 10/00* (2006.01)
*G06Q 99/00* (2006.01)

(52) U.S. Cl. ............................................. 705/28; 705/1
(58) Field of Classification Search .................... 705/28
See application file for complete search history.

(56) References Cited

U.S. PATENT DOCUMENTS

| | | | | |
|---|---|---|---|---|
| 5,586,021 | A | * | 12/1996 | Fargher et al. ............... 700/100 |
| 5,953,707 | A | * | 9/1999 | Huang et al. .................. 705/10 |
| 6,310,941 | B1 | * | 10/2001 | Crutcher et al. ........... 379/88.17 |
| 2002/0091536 | A1 | * | 7/2002 | Seaman et al. .................. 705/1 |
| 2002/0099612 | A1 | | 7/2002 | Seaman et al. |
| 2002/0103709 | A1 | * | 8/2002 | Anthony et al. ................ 705/22 |
| 2002/0156663 | A1 | * | 10/2002 | Weber et al. .................... 705/7 |
| 2003/0018516 | A1 | * | 1/2003 | Ayala et al. .................... 705/10 |
| 2003/0018546 | A1 | * | 1/2003 | Ayala et al. .................... 705/28 |

OTHER PUBLICATIONS

U.S. Appl. No. 10/163,038 filed Jun. 5, 2002, entitled Method and System for Decentralized Logistic Management of Supply Chain Networks, 37 pages.

* cited by examiner

*Primary Examiner*—Matthew S Gart
*Assistant Examiner*—Garcia Ade
(74) *Attorney, Agent, or Firm*—Cantor Colburn LLP; Derek Jennings

(57) ABSTRACT

An exemplary embodiment of the invention relates to a method and storage medium for integrating forecasting and replenishment activities for a networked supply chain including an enterprise and at least one supplier. The method comprises receiving a demand forecast for a first manufacturing cycle from the enterprise, performing a hub inventory assessment, performing a capability assessment, and transmitting a commitment response to the enterprise based upon the demand forecast, the results of the hub inventory assessment, and the results of the capability assessment. The demand forecast is utilized to manage hub inventory for use in a second manufacturing cycle. Other embodiments include a storage medium for implementing the invention.

16 Claims, 3 Drawing Sheets

|  | | TIME 1 | TIME 2 | TIME 3 | ... | TIME n |
|---|---|---|---|---|---|---|
| PART NUMBER XYZ DEMAND | FIRST CYCLE | 100 | 100 | 100 | ... | 100 |
| HUB INVENTORY | FIRST CYCLE | 200 | | | ... | |
| SUPPLIER RESPONSE | FIRST CYCLE | 100 | 100 | 100 | ... | 100 |
| DELTA | FIRST CYCLE | 200 | 200 | 200 | ... | |
| PART NUMBER XYZ DEMAND | SECOND CYCLE | 10 | 10 | 10 | ... | 10 |
| HUB INVENTORY | SECOND CYCLE | 200 | | | ... | |
| SUPPLIER RESPONSE | SECOND CYCLE | 0 | 0 | 0 | ... | -10 |
| DELTA | SECOND CYCLE | 190 | 180 | 170 | ... | |

FIG. 3

METHOD AND STORAGE MEDIUM FOR MANAGING COLLABORATIVE FORECASTING AND REPLENISHMENT

BACKGROUND

This invention relates generally to forecasting and replenishment processes, and more particularly, the present invention relates to a method for managing collaborative forecasting and replenishment processes over a computer network.

Businesses are continuously striving to find new and better ways to improve their inventory management processes in order to reduce business risks. One of the reasons why current inventory management systems fail is due to ineffective demand forecasting methods and deficient supply replenishment processes utilized by supply management teams across many industries. Predicting future demand for goods and materials is fraught with uncertainties which are further fueled by dynamic economic conditions and fluctuating markets. This instability can make forecasting future supply needs especially difficult for the manufacturing industry. For example, if the manufacturer finds either an increased or reduced demand in the product compared to its forecast, strain is placed throughout the supply chain where overstocking or depletion of components can occur quickly. In addition, if the supplier cannot deliver the components, manufacturers will often not be able to react quickly to meet demand, seek alternative sources, etc. Without keeping large stock of components on hand at the manufacturer's site, supply problems occur readily. However, keeping large stock has additional problems of its own, such as higher storage costs, an increased loss probability because components become outdated, etc. Moreover, electronic parts tend to reduce in value with time (i.e., a part that the manufacturer purchases in January will cost less in March and much less in June and so on).

Various solutions have been developed to improve existing inventory management systems such as storage warehouses or replenishment centers for facilitating quick and easy access to goods creating a buffer in the event of a sudden change in demand. By adding a third player to the supply chain process, however, additional problems in inventory management are presented. For example, coordinating supply requirements and forecasts, changes to these requirements, and their corresponding delivery schedules can be cumbersome and prone to error. Multi-party communications between supplier, warehouse, and buyer must be consistently accurate and reliable otherwise a breakdown in the supply chain can occur creating a 'chain effect' of inventory delays, and/or inaccuracies.

Software systems have been developed to address inventory replenishment problems utilizing various techniques. Such software systems are generally targeted to satisfying specific needs within a supply chain subprocess and are not equipped to manage a complete end-to-end collaborative forecast and replenishment cycle.

As the manufacturing world begins to move to build-to-order environment, greater demands are expected from the manufacturer to lower total costs in the complete supply chain, shorten throughput times, reduce stock to a minimum and provide more reliable delivery dates without constraining production due to supply issues.

What is needed, therefore, is a way to integrate and manage collaborative forecasting and replenishment processes over a computer network.

BRIEF SUMMARY

An exemplary embodiment of the invention relates to a method and storage medium for integrating forecasting and replenishment activities for a networked supply chain including an enterprise and at least one supplier. The method comprises receiving a demand forecast for a first manufacturing cycle from the enterprise, performing a hub inventory assessment, performing a capability assessment, and transmitting a commitment response to the enterprise based upon the demand forecast, the results of the hub inventory assessment, and the results of the capability assessment. The demand forecast is utilized to manage hub inventory for use in a second manufacturing cycle. Other embodiments include a storage medium for implementing the invention.

BRIEF DESCRIPTION OF THE DRAWINGS

Referring now to the drawings wherein like elements are numbered alike in the several FIGURES:

FIG. 3 is a sample demand/replenishment chart illustrating the features of the integrated forecasting and replenishment tool in an exemplary embodiment.

DETAILED DESCRIPTION OF THE PREFERRED EMBODIMENT

Figure 1:
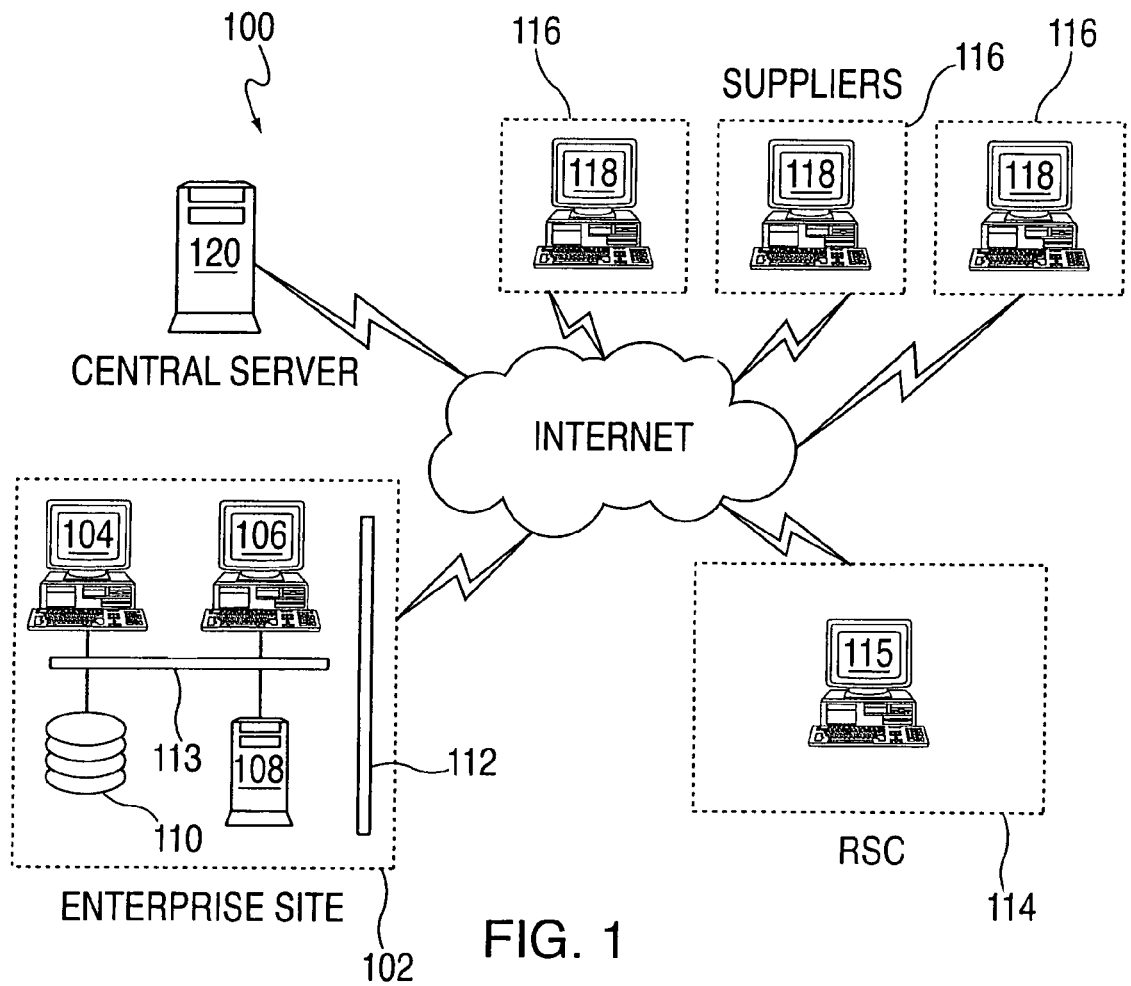
FIG. 1 illustrates a computer network system upon which the integrated forecasting and replenishment tool is implemented in an exemplary embodiment.

In an exemplary embodiment, the integrated forecasting and replenishment tool is implemented via a computer network system such as that depicted in FIG. 1. System 100 includes an enterprise site 102 which, for purposes of illustration, represents one of a plurality of electronics manufacturing facilities belonging to a business enterprise, although it will be understood that additional sites may be included in system 100 in order to realize the advantages of the invention. The business enterprise of FIG. 1 may be a large manufacturing company with manufacturing sites located all over the globe. Thus, enterprise site 102 represents one of the facilities operated by the business enterprise. Enterprise site 102 comprises divisions or groups which share requirements for common materials with similar divisions or groups from other sites associated with the business enterprise. Enterprise site 102 includes a client system 104 which represents a first manufacturing division (also referred to as group) within enterprise site 102. The terms 'group' and 'division' are synonymous and signify a product, commodity, or specialty manufacturing group associated with a business enterprise which share some common tasks or business objectives. Client system 106 signifies a second group for enterprise site 102. Client systems 104 and 106 request applications and data via a server 108 via what is commonly referred to in the art as a client/server architecture. It will be understood that any number of client systems and/or groups may be employed by enterprise site 102. Server 108 executes the business enterprise's Material Requirements Planning (MRP) and/or Enterprise Resource Planning (ERP) applications, among other tools or applications suites desired. Applications such as web server software and groupware applications are executed by server 108 for facilitating communications within site 102 as well as between site 102 and external entities. Further server 108 is executing database management software for communicating with data storage device 110. Data storage device 110 serves as a repository for a range of databases and data utilized by site 102 and which will be further explained herein. A communications link 113 is also included in site 102 which allows client systems 104 and 106, data storage device 110, and server 108 to communicate with another. Communications link 113 may be a high speed local area network such as an Ethernet, token ring, or OSI model network. In a system where more than one site 102 exist, a wide area network (WAN) linking sites together via routers, gateways, or similar software and/or hardware devices may be employed. A firewall 112 filters out unauthorized communication attempts by external entities and provides data integrity of system resources of site 102.

Central server 120 is also included in system 100 and provides a centralized system and location for directing and coordinating the activities implemented by the integrated forecasting and replenishment tool as well as other system resources desired by the business enterprise. Server 120 may be a collection of high powered computers employing multiple processors, including scalable memory and high speed capabilities. Server 120 is preferably executing applications including a central MRP engine, an optimization tool, and the integrated forecasting and replenishment tool of the invention. Specifically, central server 120 receives projected forecast data from various groups of a business enterprise which may span several enterprise site locations. Server 120 aggregates and synthesizes the forecast data, and then generates a demand forecast in the nature of an unconstrained group level forecast that is transmitted back to associated suppliers for further action. Responses received by these suppliers are further exploited by server 120 resulting in the generation of a demand forecast in the nature of a constrained forecast which is transmitted to suppliers at the individual site level. Commitment responses received from suppliers are processed and a site specific build plan is generated and implemented. Modifications to build plans are effectuated when desirable via the integrated forecasting and replenishment tool and supply replenishment activities are carried out accordingly. These processes are further described herein in FIGS. 2 and 3.

Replenishment service center (RSC) 114 provides local storage of supplier goods and inventory under an agreement with site 102. RSC 114 may be a warehouse or commercial storage facility. In one embodiment, RSC 114 includes client system 115 which is Internet-enabled and which operates web browser software for communicating with site 102 and suppliers 116. RSC 114 receives requests for goods in the form of a pull signal from enterprise site 102 and/or suppliers 116.

Suppliers 116 provide goods to enterprise sites for a business enterprise and may be geographically dispersed around the globe. Suppliers 116 include client systems 118 which are Internet-enabled and operate web browser software.

RSC 114 is strategically located in close proximity to site 102 in order to provide quick material deliveries as needed. RSC 114 may also be responsible for servicing additional sites of the business enterprise that are also located nearby in addition to site 102 if desired. Suppliers 116 provide goods to site 102 via RSC 114 based upon demand requirements of and/or agreements with site 102. Suppliers 116 ensure adequate supply levels of goods at RSC 114 via network communications facilitated by the integrated forecasting and replenishment tool as will be described further herein.

Figure 2:
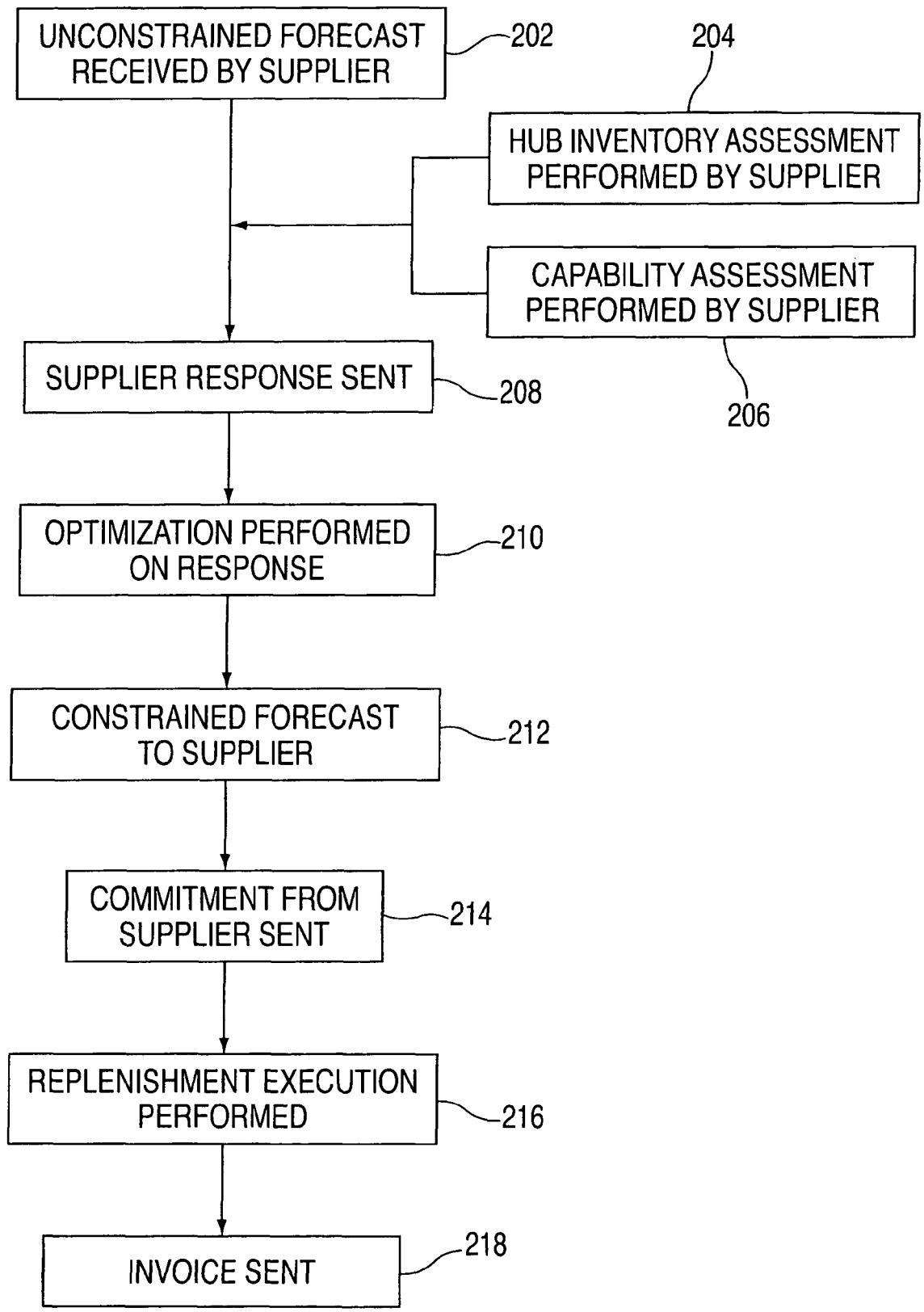
FIG. 2 is a flowchart describing the implementation of the integrated forecasting and replenishment tool in an exemplary embodiment.

In an exemplary embodiment, supplier collaboration is provided via a shared communications infrastructure; namely, a trade network environment. The integrated forecasting and replenishment tool is executed within a computer network system such as system 100 of FIG. 1. FIG. 2 describes the forecast collaboration and replenishment process utilizing the integrated forecasting and replenishment tool.

The integrated forecasting and replenishment tool combines the planning and execution processes into a single application with visibilities provided and available to enterprise sites, RSC providers, and suppliers of inventory necessary to insure the flow of the right material to each site in the needed quantities. It also provides visibility to materials in transit from a supplier site to the enterprise RSC, materials at each RSC, and materials in transit from each RSC to the respective enterprise site.

The implementation of the integrated forecasting and replenishment tool is described in FIG. 2. The process steps recited in FIG. 2 relate to a single manufacturing cycle that is defined by a length of time such as a work day, a work shift, a five-day work week, or other similar time measurement. Thus, the process described in FIG. 2 is repeated for each cycle as specified by the enterprise. A demand forecast in the nature of an unconstrained forecast is received by a supplier over the web at step 202. The unconstrained forecast represents an aggregated demand or projected forecast received from a particular group which may be scattered among a plurality of enterprise site locations. In other words, if there are multiple physical sites for the business enterprise which employ a particular manufacturing group, then the unconstrained forecast is aggregated and provided to each supplier at the business enterprise group level to which each supplier will respond with a supply capability statement. For example, one group submits a demand for 1,000 widgets of which 400 were requested by a first enterprise site such as enterprise site 102 of FIG. 1. An unconstrained forecast includes the aggregated customer demand exploded into time-bucketed materials requirements, without taking into consideration any resource constraints. The unconstrained forecast is assembled via a central materials resource planning (MRP) engine and provided to suppliers over the web.

Utilizing information in the unconstrained forecast, the supplier performs an inventory hub assessment to determine current quantities of stored items provided in the unconstrained forecast at step 204. This information may be found in data storage device 110 via the tool. The hub inventory refers to inventory materials stored in RSC 114. The supplier also performs a capability assessment at step 206 which refers to a supplier's ability to provide the items in the unconstrained forecast taking into account the stored quantities of items in the hub inventory. Upon completion of these assessments, the supplier generates a supply capability statement which represents the greatest amount of inventory a supplier can make available to the buyer in order to satisfy the buyer's demand over a specified time period. This statement is initiated over the web and transmitted to the originating group at step 208.

An optimization process and materials requirements analyses are performed on the supply capability statement at step 210 resulting in a demand forecast in the nature of a constrained forecast. This process involves examining the supplier capability in light of constraints in resources, equipment capacities, business plans, and similar obstacles or concerns generally encountered by a business in a manufacturing environment. The optimization and materials requirements analyses can be performed utilizing proprietary software or methods or may be accomplished via the method provided in U.S. application Ser. No. 09/910,544 entitled, "Network-Based Supply Chain Management Method", which was filed on Jul. 20, 2001 by the same assignee as the present application, and which is incorporated herein by reference in its entirety. The process recited in the aforementioned application involves feeding supplier capability statements into a centralized constraint-based optimization tool to square sets and add capacity constraints. Based on the results of this squared set analysis, a squared set build plan is built and delivered to an MRP engine to generate requirements for a squared set constrained forecast.

A constrained forecast is provided via the tool over the web and received by the respective supplier at step 212. The supplier responds with a formal commitment also at the site level at step 214. This formal commitment from the suppliers reflects what they will build to, or the nature and quantity of items/goods that they will deliver, and preferably includes a minimum supply that will be maintained over a specified time period.

During the manufacturing process, as site 102 consumes materials, replenishment execution is performed at step 216. This involves periodic pull signals being transmitted to the RSC as needed, requesting parts be delivered to the enterprise site from the RSC.

Since the supplier has visibility of RSC inventory statuses and pull signal information, the supplier can readily determine when to restock the RSC in order to meet the time-bucketed demand commitments as well as the guaranteed minimum supply levels. FIG. 3 illustrates a sample demand schedule and replenishment scenario for two time cycles.

Each cycle of FIG. 3 is further broken down into time buckets reflected as "time 1" through "time n". In the first cycle, a demand for part "xyz" reveals a desired quantity of 100 for each time period in the cycle. A supplier has committed to maintaining a minimum supply of the demand quantity over two time periods, i.e., 200 as shown at "time 1". Upon performing the capability assessment described in step 206, the supplier responds with a formal commitment of 100 parts for each time period of the cycle. Thus, for cycle 1 at "time 1", there is a surplus of 200 parts, i.e., the hub inventory of 200 plus the commitment of 100 parts at "time 1" minus the expected consumption of 100 parts at "time 1".

The same analysis applies for "time 2" through "time n" of cycle 1.

At cycle 2, the demand has been reduced to 10 parts for each time period "time 1" through "time n". At "time 1" there is 200 parts in inventory as a result of an inventory assessment performed in step 204 of FIG. 2. The supplier performs a capability assessment as described in step 206 of FIG. 2 and returns a response of "0" parts because the current hub inventory can more than meet the required demand for the time periods shown in cycle 2. The hub inventory does not require replenishment and the two-time period minimum supply is maintained.

By combining the replenishment information into the planning processes and assessing the hub inventory levels as a source of supply, the amount of excess materials forced into the supply chain can be minimized. Combining supply assessments or forecast/commit processes with enhanced replenishment processes and invoicing processes into an integrated application with expanded visibility capabilities offers benefits to supply chain partners in the way of common visibility of demand and supply re-balancing, capacity optimization, inventory reduction, premium transportation expense reduction, and minimization of inventory stock outs.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While preferred embodiments have been shown and described, various modifications and substitutions may be made thereto without departing from the spirit and scope of the invention. Accordingly, it is to be understood that the present invention has been described by way of illustration and not limitation.

The invention claimed is:

1. A method for integrating forecasting and replenishment activities for a networked supply chain, said networked supply chain including an enterprise and at least one supplier, the method comprising:
    receiving a demand forecast for a first manufacturing cycle from said enterprise;
    performing, via a computer processor, a hub inventory assessment;
    performing, via the computer processor, a capability assessment;
    transmitting a commitment response to said enterprise based upon:
    said demand forecast;
    results of said hub inventory assessment; and results of said capability assessment; and
    utilizing said demand forecast to manage hub inventory for use in a second manufacturing cycle.

2. The method of claim 1, wherein said manufacturing cycle comprises a pre-defined time period.

3. The method of claim 1, wherein said commitment response includes a specified quantity of items that will be provided to said enterprise for a stated manufacturing cycle.

4. The method of claim 1 wherein said commitment response includes a minimum supply of items that will be maintained over a specified time period.

5. The method of claim 1 wherein said performing said hub inventory assessment includes determining current quantities of items available in storage, said items listed in said demand forecast.

6. The method of claim 1, wherein said performing said capability assessment includes determining a quantity of items available for delivery to said enterprise taking into account said demand forecast, available items in said hub inventory, and external sources of supply.

7. The method of claim 1, wherein said utilizing said demand forecast to manage hub inventory for use in a second manufacturing cycle includes:
    receiving a second demand forecast;

utilizing said second demand forecast to determine whether sufficient quantities of items provided in said second demand forecast are available in said hub inventory; and conducting replenishment activities in accordance with said second demand forecast.

8. The method of claim 7, wherein said replenishment activities includes at least one of:

utilizing existing inventory to satisfy requirements provided in said demand forecast; and restocking said hub inventory with additional items operable for satisfying requirements provided in said demand forecast.

9. A storage medium encoded with machine-readable computer program code for integrating forecasting and replenishment activities for a networked supply chain, said networked supply chain including an enterprise and at least one supplier, the storage medium including instructions, which upon execution of the instructions by a computer, cause the computer to implement a method comprising:

receiving a demand forecast for a first manufacturing cycle from said enterprise;

performing a hub inventory assessment;

performing a capability assessment;

transmitting a commitment response to said enterprise based upon:

said demand forecast;

results of said hub inventory assessment; and results of said capability assessment; and utilizing said demand forecast to manage hub inventory for use in a second manufacturing cycle.

10. The storage medium of claim 9, wherein said manufacturing cycle comprises a pre-defined time period.

11. The storage medium of claim 9, wherein said commitment response includes a specified quantity of items that will be provided to said enterprise for a stated manufacturing cycle.

12. The storage medium of claim 9 wherein said commitment response includes a minimum supply of items that will be maintained over a specified time period.

13. The storage medium of claim 9 wherein said performing said hub inventory assessment includes determining current quantities of items available in storage, said items listed in said demand forecast.

14. The storage medium of claim 9, wherein said performing said capability assessment includes determining a quantity of items available for delivery to said enterprise taking into account said demand forecast, available items in said hub inventory, and external sources of supply.

15. The storage medium of claim 9, wherein said utilizing said demand forecast to manage hub inventory for use in a second manufacturing cycle includes:

receiving a second demand forecast;

utilizing said second demand forecast to determine whether sufficient quantities of items provided in said second demand forecast are available in said hub inventory; and conducting replenishment activities in accordance with said second demand forecast.

16. The storage medium of claim 15, wherein said replenishment activities includes at least one of:

utilizing existing inventory to satisfy requirements provided in said demand forecast; and restocking said hub inventory with additional items operable for satisfying requirements provided in said demand forecast.

* * * * *